United States Patent [19]

Aoki et al.

[11] Patent Number: 5,549,730
[45] Date of Patent: Aug. 27, 1996

[54] COMPRESSION MOLDED TABLET FERTILIZER AND METHOD THE PRODUCTION THEREOF

[75] Inventors: Hiroshi Aoki, Kitakyushu; Michihiro Inokuchi, Nakama, both of Japan

[73] Assignee: Mitsubishi Chemical Corporation, Tokyo, Japan

[21] Appl. No.: 270,664

[22] Filed: Jul. 5, 1994

[30] Foreign Application Priority Data

Jul. 6, 1993 [JP] Japan ................. 5-166951

[51] Int. Cl.$^6$ ........................................ C05G 5/00
[52] U.S. Cl. ........................................ 71/64.03
[58] Field of Search .................. 71/9, 15, 20, 64.13, 71/64.07, 64.11, 64.03

[56] References Cited

U.S. PATENT DOCUMENTS

| | | |
|---|---|---|
| 4,304,589 | 12/1981 | Kano et al. |
| 4,605,550 | 8/1986 | Trill ........................... 71/64.11 |
| 5,238,480 | 8/1993 | Rehberg et al. ........................... 71/28 |

FOREIGN PATENT DOCUMENTS

| | | |
|---|---|---|
| 59-190287 | 10/1984 | Japan . |
| 192482 | 8/1987 | Japan ........................... 71/64.13 |
| 63-123889 | 5/1988 | Japan . |

*Primary Examiner*—Ferris Lander
*Attorney, Agent, or Firm*—Oblon, Spivak, McClelland, Maier, & Neustadt, P.C.

[57] ABSTRACT

This invention relates to a compression molded tablet fertilizer, possessing an ability to release slowly the active ingredients thereof suited to horticulture and afforestation, excelling in moldability, and revealing only sparing inconstancy of distribution of fertilizer components.

The compression molded fertilizer comprises particulate fertilizer ingredients and 0.01 to 8% by weight of inorganic salt of lignin sulfonic acid and 0.01 to 0.8% by weight of inorganic salt of stearic acid both based on the amount of the particulate fertilizer ingredients. A method for the production of the compression molded tablet fertilizer is also disclosed.

4 Claims, No Drawings

COMPRESSION MOLDED TABLET FERTILIZER AND METHOD THE PRODUCTION THEREOF

FIELD OF THE INVENTION

This invention relates to a compression molded tablet fertilizer capable of slowly releasing active ingredients and suitable for use in horticulture and afforestation, and a method for the production thereof.

BACKGROUND OF THE INVENTION

Recently, the mode of cultivation resorting to the use of plug seedlings has disseminated in the fields of horticulture and afforestation. In this area fertilizers capable of furnishing fertilizing effect over periods ranging from one month to one year are demanded for the sake of pot seedlings and potted plants.

The conventional fast-releasing fertilizers using ammonium sulfate, urea, and ammonium phosphate are incapable of furnishing fertilizing effect over periods ranging from one month to one year. Some of the slow-releasing granular fertilizers having particle diameters in the range of from 2 to 10 mm are capable of furnishing fertilizing effect over a period of several months. They, however, have a particle size distribution. When such a fertilizer is applied to pots at a rate fixed by the number of grains, therefore, it tends to give rise to a difference in weight of fertilizer or a difference in efficacy of fertilizer among the pots under treatment. When this fertilizer is applied to the pots at a rate fixed by weight instead, the individual portion of the fertilizer to be supplied to each pot must be weighed out precisely one by one at the cost of time and labor.

As a slowly-releasing shaped fertilizer uniform in size, a molded briquette fertilizer which is produced by compression molding, using a roll press, a mixture of isobutylidene diurea, namely one of the reaction products of aldehyde and urea, and mineral heavy oil (as disclosed in Japan Tokkyo Kokoku 54-24,942, for example) has been known and has been widely used. This molded fertilizer excels in such properties as hardness, ability to retain shape in water, and strength to withstand the impact of fall. It shows, however, a fertilizing effect over a long period such as ranges from one to five years and, therefore, is unsuitable for uses which require the fertilizing effect over such a medium length of period as ranges from one month to one year. Besides, the roll press mentioned above poses a problem. The roll press permits easy production of molded fertilizers of 5 to 100 cm³ in volume. An attempt to produce lumps of fertilizer in a volume of less than 5 cm³ to obtain the fertilizing effect duration within a range of from one mouth to one year, however, inevitably requires a decrease in the size of the roll part of the roll press, with the result that the roll press will fail to generate necessary molding pressure and suffer from very poor molding capacity.

For the purpose of producing molded lumps of fertilizer with a volume of less than 5 cm³, an idea of adopting compression molding method by a tabletting machine to exert the necessary molding pressure may be conceived. When the compression molded fertilizer is produced by a tabletting machine, the obtained tablets are required to show fast shape retention and hardness and ensure high yield of production. So they must exhibit an exalted mold release property and be precluded from such adverse phenomena as capping (surface excoriation) and lamination (layer separation). The addition of an inorganic salt of stearic acid or talc has been known as means to improve the mold release property (Japan Tokkyo Kokai 59-190,287). The addition of an inorganic salt of stearic acid, however, is liable to induce the phenomenon of capping and lamination. A method which is capable of producing compression molded tablet of fertilizer excelling in moldability and yield of production has never been established. A method which attains the improvement of the moldability of fertilizer by the addition of an inorganic salt of lignin sulfonic acid has been known to the art (Japan Tokkyo Kokai 63-123,889 and Japan Tokkyo Kokoku 54-24,942). This method, however, poses a problem of poor mold release after the step of compression molding. Further, in the molded fertilizer produced by these methods, the fertilizer components are not uniformly distributed in the fertilizer composition, because the ingredients of fertilizer vary in grain size and other properties. Thus, the individual tablets of compression molded fertilizer reveal considerable inconstancy of distribution of fertilizer components and, therefore, are incapable of permitting accurate fertilization.

SUMMARY OF THE INVENTION

This invention has for an object thereof the provision of a compression molded tablet fertilizer which excels in moldability, reveals only sparing inconstancy of distribution of fertilizer components, and possesses an ability of slowly releasing active ingredients suited to horticulture and afforestation.

After continuing a diligent study for the accomplishment of this object, the present inventors have found that the problems mentioned above are solved by adding specific amounts of inorganic salts of lignin sulfonic acid and inorganic salts of stearic acid and a small amount of water to fertilizer ingredients, mixing them, and compression molding the resultant mixture in the shape of tablets. This invention has been perfected as a result.

Specifically, an aspect of this invention resides in a compression molded tablet fertilizer comprising a particulate fertilizer ingredients, 0.01 to 8% by weight of inorganic salt of lignin sulfonic acid and 0.01 to 0.8% by weight of inorganic salt of stearic acid both based on the amount of the particulate fertilizer ingredients. Another aspect of the invention resides in a method for the production of a compression molded tablet fertilizer, which comprises mixing a particulate fertilizer ingredients, 0.01 to 8% by weight of inorganic salt of lignin sulfonic acid and 0.01 to 0.8% by weight of inorganic salt of stearic acid both based on the amount of the particulate fertilizer ingredients, with a small amount of water, and compression molding the resultant mixture by a tabletting machine.

DETAILED DESCRIPTION OF THE INVENTION

As examples of the fertilizer ingredients to be used in this invention, various kinds of fertilizers may be mentioned such as: sparingly water-soluble nitrogen fertilizers produced by the reaction of aldehydes of not more than four carbon atoms with urea, namely reaction products of aldehydes above mentioned such as isobutyraldehyde, n-butyraldehyde, propionaldehyde, crotonaldehyde, acetaldehyde, and formaldehyde or mixtures thereof with urea, e.g. isobutylidene diurea, n-butylidene diurea, propylidene diurea, crotonylidene diurea, and ethylidene diurea; and the reaction products of formaldehydes with urea having the same degree of water solubility as isobutylidene diurea. As examples of other fertilizer ingredients, ammonium sulfate, urea, ammonium nitrate, ammonium chloride, ammonium phosphate, superphosphate, triple superphosphate, fused phosphate fertilizer, prepared phosphate fertilizer, potassium sulfate, potassium chloride, and potassium silicate may be cited. The fertilizer ingredients which are sparingly soluble in water may be used independently or they may be used as combined with other fertilizer ingredients so as to suit particular plants subjected to fertilization. The grain size of the particulate fertilizer ingredients is desired to be so adjusted that the individual particles of the fertilizer ingredients may pass a screen of a mesh size of 1 mm in consideration of their packability in a mold.

The inorganic salts of lignin sulfonic acid which are usable as one of the fertilizer ingredients in this invention include calcium salt, sodium salt, potassium salt, and magnesium salt of lignin sulfonic acid, for example. The inorganic salt may be in the form of powder or liquid. The amount of this inorganic salt to be used in the particulate fertilizer ingredients is in the range of from 0.01 to 8% by weight, desirably from 0.01 to 5% by weight, and more desirably from 0.1 to 5% by weight, based on the amount of the particulate fertilizer ingredients. As regards the method of addition, this inorganic salt may be added simultaneously with mixing the particulate fertilizer ingredients with other fertilizer ingredients or it may be added subsequently to mixing the particulate fertilizer ingredients. In any event, the added inorganic salt of lignin sulfonic acid is required to be thoroughly dispersed in the mixture of fertilizer components. Preferably, the mixing may be continued more than 10 minutes.

The inorganic salts of stearic acid which are usable as one of the fertilizer ingredients in this invention, include aluminum salt, calcium salt, magnesium salt, barium salt, and zinc salt of stearic acid, for example. Among other salts mentioned above, magnesium salt and calcium salt are particularly desirable. The amount of this inorganic salt to be used in the particulate fertilizer ingredients of this invention is in the range of from 0.01 to 0.8% by weight, desirably from 0.01 to 0.5% by weight, and more desirably from 0.1 to 0.5% by weight, based on the amount of the particulate fertilizer ingredients. This inorganic salt may be added simultaneously with mixing the particulate fertilizer ingredients with other fertilizer ingredients, or it may be added subsequently to mixing the particulate fertilizer ingredients. Preferably, the addition is attained effectively at the time that the mixing of the fertilizer ingredients is about to be completed. More desirably, the addition is attained about 30 seconds to 5 minutes before the time of mixing is completed.

The amount of the water to be added to the particulate fertilizer ingredients in this invention is generally in the range of from 0.1 to 5% by weight, based on the amount of particulate fertilizer ingredients. The water content in this range suffices for the purpose of facilitating supply of materials and molding of mixture, and ensuring manufacture of satisfactory products. Preferably, the order of mixing these additives is; (1) addition of inorganic salts of lignin sulfonic acid to the fertilizer ingredients, and to be dispersed thoroughly, (2) addition of water, and mixing them, (3) addition of the inorganic salts of stearic acid, and mixing them. Following examples are all made by this order.

The volume of each molded tablet fertilizer is generally in the range of from 0.1 to 5 cm$^3$, preferably in the range of from 0.5 to 4 cm$^3$, in view of the period of duration of fertilizing effect of the present invention. The shape of a mold to be used for the tabletting machine for the compression molding is arbitrary, and may be in the shape of a disc or an elliptic disc, for example.

Now, this invention will be described more specifically below with reference to working examples thereof. It is to be understood that the invention is not limited to these working examples but may be otherwise variously embodied and practiced without departure from the spirit of the invention. Wherever "parts" is mentioned in the following examples, it invariably refers to "parts by weight."

EXAMPLE 1 AND COMPARATIVE EXAMPLES 1 TO 3

A mixture consisting of 258 parts of granular isobutylidene diurea having particle diameters of 0.2 to 0.7 mm (produced by Mitsubishi Kasei Corporation and marketed under the trademark of "IBDU"), 54 parts of minute urea particles passed through a screen of a mesh size of 1 mm, 350 parts of prepared particulate phosphate fertilizer pulverized and passed through a screen of a mesh size of 1 mm (produced by Mitsubishi Kasei Corporation and marketed under the trademark of "Rinstar"), 178 parts of potassium sulfate passed through a screeen of a mesh size of 1 mm, and 80 parts of particulate potassium silicate passed through a screen of a mesh size of 1 mm was prepared. This mixture and 0.4% by weight of magnesium stearate, 1% by weight of inorganic salts of lignin sulfonic acid (formed mainly of calcium lignin sulfonate, produced by Sanyo-Kokusaku Pulp Co., Ltd. and marketed under the trademark of "San-X"), and 0.5% by weight of water, respectively based on the amount of the mixture, were mixed. The resultant mixture was compression molded by use of a tablet machine (produced by Kikusui Seisakusho K. K.) to produce a molded fertilizer in the shape of tablets with a weight of 2 g (Example 1).

For the purpose of comparison, molded fertilizers were produced by following the same procedure as in Example 1 while omitting the addition of magnesium stearate and the inorganic salts of lignin sulfonic acid (Comparative Example 1), adding magnesium stearate alone in an amount of 0.2% by weight (Comparative Example 2), and adding the inorganic salts of lignin sulfonic acid alone in an amount of 0.2% by weight (Comparative Example 3).

The molded fertilizers thus obtained were tested for the presence or absence of capping, mold release property, hardness (measured by use of a hardness tester produced by Kiya Seisakusho K. K.), and the appearance of product. The results are shown in Table 1.

TABLE 1

|  | Example | Comparative Examples | | |
| --- | --- | --- | --- | --- |
|  | 1 | 1 | 2 | 3 |
| Amount of magnesium stearate (% by weight) | 0.4 | — | 0.2 | — |
| Amount of inorganic salts of lignin sulfonic acid (% by weight) | 1 | — | — | 1 |
| Capping | No | Yes | No | Yes |
| Mold release | Good | Bad | Good | Bad |
| Hardness (kg) | 6 | 3 | 3 | 4 |
| Appearance | Good | Bad | Bad | Bad |

EXAMPLE 2 AND COMPARATIVE EXAMPLES 4 AND 5

A mixture consisting of 258 parts of granular isobutylidene diurea having particle diameters of from 0.2 to 0.7 mm (produced by Mitsubishi Kasei Corporation and marketed under the trademark of "IBDU"), 119 parts of ammonium sulfate pulverized and passed through a screen of a mesh size of 1 mm, 350 parts of prepared particulate phosphate fertilizer pulverized and passed through a screen of a mesh size of 1 mm (produced by Mitsubishi Kasei Corporation and marketed under the trademark of "Rinstar"), and 210 parts of potassium sulfate passed through a screeen of a mesh size of 1 mm was prepared.

The mixture and 0.4% by weight of magnesium stearate, 1% by weight of inorganic salts of lignin sulfonic acid (produced by Sanyo-Kokusaku Pulp Co., Ltd. and marketed under the trademark of "San-X"), and 0.5% by weight of water, respectively based on the amount of the mixture were mixed. The resultant mixture was compression molded by use of a tablet machine (produced by Kikusui Seisakusho K. K.) to produce a molded fertilizer in the shape of tablets with a weight of 2 g (Example 2).

For the purpose of comparison, molded fertilizers were produced by following the same procedure as in Example 2 while adding magnesium stearate alone in an amount of 0.2% by weight (Comparative Example 4) and adding the inorganic salts of lignin sulfonic acid alone in an amount of 1% by weight (Comparative Example 5).

The molded fertilizers were tested for the presence or absence of capping, mold release property, hardness, and the appearance of product. The results are shown in Table 2.

TABLE 2

|  | Example | Comparative Examples | |
| --- | --- | --- | --- |
|  | 2 | 4 | 5 |
| Amount of magnesium stearate (% by weight) | 0.4 | 0.2 | — |
| Amount of inorganic salts of lignin sulfonic acid (% by weight) | 1 | — | 1 |
| Capping | No | No | Yes |
| Mold release | Good | Good | Bad |
| Hardness (kg) | 6 | 3 | 3 |
| Appearance | Good | Bad | Bad |

EXAMPLES 3 AND 4 AND COMPARATIVE EXAMPLES 6 TO 11

A mixture consisting of 339 parts of granular isobutylidene diurea having particle diameters of from 0.2 to 0.7 mm (produced by Mitsubishi Kasei Corporation and marketed under the trademark of "IBDU"), 350 parts of prepared particulate phosphate fertilizer pulverized and passed through a screen of a mesh size Of 1 mm (produced by Mitsubishi Kasei Corporation and marketed under trademark of "Rinstar"), and 210 parts of potassium sulfate passed through a screen of a mesh size of 1 mm was prepared.

The mixture and 0.4% by weight of magnesium stearate, 1% by weight of inorganic salts of lignin sulfonic acid (produced by Sanyo-Kokusaku Pulp Co., Ltd. and marketed under the trademark of "San-X"), and 0.5% by weight of water, respectively based on the amount of the mixture, were mixed. The resultant mixture was compression molded by use of a tablet machine (produced by Kikusui Seisakusho K. K.) to produce a molded fertilizer in the shape of tablets with a weight of 2 g (Example 3).

A molded fertilizer was produced by following the procedure of Example 3 while changing the amount of magnesium stearate to 0.5% by weight and that of the inorganic salts of lignin sulfonic acid to 5% by weight (Example 4).

For the purpose of comparison, molded fertilizers were produced by following the same procedure as in Example 3 while omitting the addition of both magnesium stearate and the inorganic salts of lignin sulfonic acid (Comparative Example 6), adding the inorganic salts of lignin sulfonic acid alone in an amount of 0.5% by weight (Comparative Example 7), adding magnesium stearate alone in an amount of 0.2% by weight (Comparative Example 8), adding magnesium stearate and the inorganic salts of lignin sulfonic acid both in an equal amount of 0.005% by weight (Comparative Example 9), adding magnesium stearate in an amount of 0.2% by weight and the inorganic salts of lignin sulfonic acid in an amount of 10% by weight (Comparative Example 10), and adding magnesium stearate in an amount of 1% by weight and the inorganic salts of lignin sulfonic acid in an amount of 10% by weight (Comparative Example 11).

The molded fertilizers were tested for the presence or absence of capping, mold release property, hardness, appearance of product, and variations of the contents of fertilizer components (N, P, and K). The results are shown in Table 3.

The variations in the component contents of a produced molded fertilizer were determined by randomly selecting five of the tablets of the molded fertilizer, finding N, P, and K contents severally in the five tablets, averaging the relevant numerals representing the contents, and reporting the averages (absolute averages of variations of component contents) in percentage.

In Comparative Examples 10 and 11, the mixtures prepared could not be compression molded into tablets because of unduly low moldability. Thus, no molded fertilizer was obtained in these examples.

TABLE 3

|  |  | Examples | | Comparative Examples | | | | | |
| --- | --- | --- | --- | --- | --- | --- | --- | --- | --- |
|  |  | 3 | 4 | 6 | 7 | 8 | 9 | 10 | 11 |
| Amount of magnesium stearate (% by weight) |  | 0.4 | 0.5 | 0 | 0 | 0.2 | 0.005 | 0.2 | 1 |
| Amount of inorganic salts of lignin sulfonic acid (% by weight) |  | 1 | 5 | 0 | 0.5 | 0 | 0.005 | 10 | 10 |
| Capping |  | ○ | ○ | x | Δ | x | x | — | — |
| Mold release |  | ○ | ○ | x | ○ | ○ | ○ | — | — |
| Hardness (kg) |  | 6.5 | 7.3 | 4.2 | 6.3 | 3.0 | 5.5 | — | — |
| Appearance |  | ○ | ○ | x | Δ | x | x | — | — |
| Variations in contents | N | 1.7 | 2.2 | 2.1 | 2.7 | 2.4 | 3.4 | — | — |
| of fertilizer | P | 1.2 | 2.8 | 5.1 | 5.3 | 12.5 | 10.0 | — | — |

TABLE 3-continued

|  |  | Examples | | Comparative Examples | | | | | |
|---|---|---|---|---|---|---|---|---|---|
|  |  | 3 | 4 | 6 | 7 | 8 | 9 | 10 | 11 |
| components (%) | K | 1.0 | 1.4 | 5.1 | 10.5 | 9.8 | 13.9 | — | — |

It is clearly remarked from Tables 1 to 3 that the molded fertilizers obtained in the shape of tablets in accordance with this invention were invariably excellent in capping, mold release property, hardness, and appearance and exhibited satisfactory moldability. The variations in the contents of fertilizer components (N, P, and K) were small. This fact indicates that the present invention permits production of molded fertilizers having very accurate N-P-K ratios and ensures highly accurate fertilization of plants.

What is claimed is:

1. A compression molded tablet fertilizer consisting essentially of particulate fertilizer ingredients, and mixed therein 0.01 to 8% by weight of inorganic salt of lignin sulfonic acid, and 0.01 to 0.8% by weight of inorganic salt of stearic acid both based on the amount of said particulate fertilizer ingredients.

2. A compression molded tablet fertilizer according to claim 1, wherein said inorganic salt of lignin sulfonic acid accounts for a proportion in the range of from 0.01 to 5% by weight based on the amount of said particulate fertilizer ingredients.

3. A compression molded tablet fertilizer according to claim 1, wherein said inorganic salt of stearic acid accounts for a proportion in the range of from 0.01 to 0.5% by weight based on the amount of said particulate fertilizer ingredients.

4. A compression molded tablet fertilizer according to claim 1, wherein said inorganic salt of stearic acid is selected from the group consisting of magnesium salts and calcium salts of stearic acid.

* * * * *

UNITED STATES PATENT AND TRADEMARK OFFICE
CERTIFICATE OF CORRECTION

PATENT NO.   : 5,549,730
DATED        : August 27, 1996
INVENTOR(S)  : Hiroshi AOKI, et al.

It is certified that error appears in the above-indentified patent and that said Letters Patent is hereby corrected as shown below:

On the title page, Item [54], and column 1, the title should read:

-- [54] COMPRESSION MOLDED TABLET FERTILIZER AND
        METHOD FOR PRODUCTION THEREOF.--

Signed and Sealed this

Tenth Day of December, 1996

Attest:

BRUCE LEHMAN

*Attesting Officer*   *Commissioner of Patents and Trademarks*